United States Patent
Sugavanam et al.

(10) Patent No.: US 12,418,543 B2
(45) Date of Patent: Sep. 16, 2025

(54) USER AUTHENTICATION BASED ON PERIODIC SAMPLING OF LOCATION COORDINATES

(71) Applicant: INTERNATIONAL BUSINESS MACHINES CORPORATION, Armonk, NY (US)

(72) Inventors: Krishnan Sugavanam, Mahopac, NY (US); Aris Gkoulalas-Divanis, Waltham, MA (US); Sophie Batchelder, Cambridge, MA (US); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 18/303,011

(22) Filed: Apr. 19, 2023

(65) Prior Publication Data
US 2024/0056455 A1 Feb. 15, 2024

(30) Foreign Application Priority Data
Aug. 9, 2022 (GR) .............................. 20220100667

(51) Int. Cl.
*H04L 9/40* (2022.01)
(52) U.S. Cl.
CPC .......... *H04L 63/107* (2013.01); *H04L 63/083* (2013.01)
(58) Field of Classification Search
CPC ....... H04L 63/08; H04L 63/10; H04L 63/107; H04L 63/12; H04L 63/123; H04L 63/126
See application file for complete search history.

(56) References Cited

U.S. PATENT DOCUMENTS 9,894,052 B2 * 2/2018 Siddiqui ............... H04W 12/64
10,404,714 B1 * 9/2019 Masters ................ H04L 63/108
(Continued)

FOREIGN PATENT DOCUMENTS

CN 107835155 A 3/2018
CN 104025504 B 7/2018
(Continued)

OTHER PUBLICATIONS

"Patent Cooperation Treaty PCT International Search Report", International Application No. PCT/EP2023/071161, International Filing Date Jul. 31, 2023:, Date of Mailing: Feb. 6, 2024, 13 pages.
(Continued)

*Primary Examiner* — Hosuk Song
(74) *Attorney, Agent, or Firm* — Anthony M. Pallone (57) ABSTRACT

According to one embodiment, a method, computer system, and computer program product for user authentication. The embodiment may include receiving, from a first device, multiple location coordinates of the first device. The embodiment may include storing, on a second device, a second moving window comprising last n location coordinates of the multiple location coordinates. The embodiment may include receiving, from the first device, a request to access the second device, wherein the request comprises log-in credentials and a first hash value. The embodiment may include computing, on the second device, a second hash value based on the second moving window. The embodiment may include verifying the log-in credentials. The embodiment may include comparing the first hash value and the second hash value. In response to the first and the second hash values being equal, and the log-in credentials being verified, the embodiment may include granting access.

17 Claims, 2 Drawing Sheets

(56) References Cited

U.S. PATENT DOCUMENTS

| | | | |
|---|---|---|---|
| 10,477,994 | B2 | 11/2019 | Johnson |
| 10,645,069 | B2* | 5/2020 | Siddiqui ............... H04W 12/10 |
| 10,951,606 | B1 | 3/2021 | Shahidzadeh |
| 10,972,471 | B2 | 4/2021 | Connell, II |
| 11,218,933 | B2 | 1/2022 | Edge |
| 11,245,690 | B1 | 2/2022 | Yoon |
| 11,297,055 | B2 | 4/2022 | Momchilov |
| 11,354,400 | B2 | 6/2022 | Chauhan |
| 2016/0105801 | A1 | 4/2016 | Wittenberg et al. |
| 2016/0261606 | A1* | 9/2016 | Salvador ............. H04L 63/0263 |
| 2016/0269385 | A1* | 9/2016 | Siddiqui ................. H04W 4/80 |
| 2016/0269403 | A1 | 9/2016 | Koutenaei |
| 2017/0279795 | A1* | 9/2017 | Redberg ............. H04L 63/0861 |
| 2017/0289813 | A1 | 10/2017 | Pashkov |
| 2018/0167376 | A1* | 6/2018 | Siddiqui ............... H04W 12/64 |
| 2019/0231097 | A1 | 8/2019 | Johnson |
| 2020/0028689 | A1 | 1/2020 | Vadassery |
| 2021/0288973 | A1 | 9/2021 | Dimble |
| 2022/0385656 | A1 | 12/2022 | Gujarathi |
| 2023/0091318 | A1 | 3/2023 | Lindemann |
| 2023/0101582 | A1 | 3/2023 | Long et al. |
| 2023/0112126 | A1 | 4/2023 | Soryal et al. |
| 2023/0164570 | A1 | 5/2023 | Khandare et al. |
| 2023/0353579 | A1 | 11/2023 | Patel et al. |
| 2023/0403274 | A1 | 12/2023 | Soppet et al. |
| 2024/0195807 | A1 | 6/2024 | Sugavanam et al. |

FOREIGN PATENT DOCUMENTS

| | | |
|---|---|---|
| CN | 119678427 A | 3/2025 |
| EP | 4569735 A2 | 6/2025 |
| KR | 20080075964 A | 8/2008 |
| WO | 2024/033130 A2 | 2/2024 |

OTHER PUBLICATIONS

Authy, "Sync 2FA Across Mobile, Tablet and Desktop," Authy.com, Accessed: Nov. 11, 2021, https://authy.com/features/multiple-devices/, 2 pages.

Disclosed Anonymously, "A method to detect and restrict access to resources post 2FactorAuth password compromise and reset executed by a potential impersonated user," IP.com, IP.com No. IPCOM000260707D, IP.com Publication Date: Dec. 17, 2019, 4 pages.

Disclosed Anonymously, "Dynamic One-Time Pin (OTP)-Based Authentication," IP.com, IP.com No. IPCOM000266067D, IP.com Publication Date: Jun. 10, 2021, 4 pages.

Disclosed Anonymously, "Location-Based Authentication Using Sensors," IP.com, IP.com No. IPCOM000260487D, IP.com Publication Date: Nov. 27, 2019, 4 pages.

Disclosed Anonymously, "Method and System for Providing Location-based Access to Sensitive Data," IP.com, IP.com No. IPCOM000236057D, IP.com Publication Date: Apr. 3, 2014, 3 pages.

Disclosed Anonymously, "Multi-Factor Authentication of IoT Devices Based on IoT Sensor's Observations of Itself or of Device Surroundings," IP.com, IP.com No. IPCOM000269334D, IP.com Publication Date: Apr. 6, 2022, 6 pages.

Disclosed Anonymously, "Secondary Control/Dual Authentication for User Logins," IP.com, IP.com No. IPCOM000259083D, IP.com Publication Date: Jul. 11, 2019, 4 pages.

Disclosed Anonymously, "Self-Service Method and System for Restoring Access to a Password-Less Account," IP.com, IP.com No. IPCOM000267811D, IP.com Publication Date: Nov. 28, 2021, 6 pages.

Disclosed Anonymously, "Verification of One-Time Passwords Based on a Pre-Authenticated Receiving Device," IP.com, IP.com No. IPCOM000269057D, IP.com Publication Date: Mar. 18, 2022, 6 pages.

Duraisamy et al., "A Framework for User Authentication and Authorization using Request based One Time Passkey and User Active Session Identification," Research Gate, International Journal of Computer Applications (0975-8887), vol. 172—No. 10, Aug. 2017, 7 pages.

Gruteser et al., "Enhancing Privacy Preservation of Anonymous Location Sampling Techniques in Traffic Monitoring Systems," ResearchGate, Conference Paper, Aug. 2006. DOI: 10.1109/SECCOMW.2006.359553, 4 pages.

Pinola, "Authy Brings Two-Factor Authentication to Your PC, No Need for a Phone," life hacker, Apr. 29, 2014, https://lifehacker.com/authy-brings-two-factor-authentication-to-your-pc-no-n-1569284437, 6 pages.

Wikipedia, "One-time password," Wikipedia—The Free Encyclopedia, Accessed: Jun. 21, 2022, https://en.wikipedia.org/wiki/One-time_password, 9 pages.

Sugavanam et al., "User Authentication Based on Periodic Sampling of Location Coordinates", GR Application No. 20220100667, Filed: Aug. 9, 2022, 27 Pages.

Sugavanam et al., "Location Coordinate-Based User Authentication With Device Loss Security Tolerance", GR Application No. 20220101013, Filed: Dec. 7, 2022, 33 pages.

Sugavanam et al., "Location Coordinate-Based User Authentication With Device Loss Security Tolerance", US IBM U.S. Appl. No. 18/303,054, filed Apr. 19, 2023, 33 Pages.

Gordon, "The Best Two-Factor Authentication App for iPhone," life hacker, Retrieved from: https://lifehacker.com/the-best-two-factor-authentication-app-for-iphone-1640526694, 2014, 10 pages.

Guo et al., "Location Privacy-Preserving Method Based on Historical Proximity Location," Hindawi, Wireless Communications and Mobile Computing, Retrieved from: https://doi.org/10.1155/2020/8892079, Article ID 8892079, 2020, 16 pages.

IBM Appendix P, List of IBM Patents or Patent Applications Treated as Related, Apr. 19, 2023, 2 pages.

Ravenscraft et al., "What Happens If I Use Two-Factor Authentication and Lose My Phone?" life hacker, Retrieved from: https://lifehacker.com/what-do-i-do-if-i-use-two-factor-authentication-and-los-1668727532, 2022, 16 pages.

Zukarnain et al., "Authentication Securing Methods for Mobile Identity: Issues, Solutions and Challenges," Retrieved from: https://doi.org/10.3390/sym14040821, Symmetry 14(4), 821, 2022, 18 pages.

* cited by examiner

USER AUTHENTICATION BASED ON PERIODIC SAMPLING OF LOCATION COORDINATES

BACKGROUND

The present invention relates generally to the field of computing, and more particularly to multi-factor authentication of a user.

User authentication verifies the identity of a user requesting access to a computing system by authorizing a human-to-machine transfer of credentials during interactions on a network to confirm the user's authenticity. Authentication helps to ensure only authorized users gain access (i.e., log-in) to a network or computing system by preventing unauthorized users from gaining such access. Categories of factors (i.e., pieces of evidence) used in user authentication may include knowledge factors, possession factors, and inherence factors. Knowledge factors may include things the user must know in order to log-in to the network or computing system (e.g., username, user id, password, personal identification numbers). Possession factors may include things the user must have in their possession in order to complete the log-in (e.g., one-time password (OTP), key fob, smartphone app, employee identification card). Inherence factors may include characteristics inherent to the user which confirm their identity (e.g., biometrics, facial recognition, voice authentication). Multi-factor authentication (MFA) is an electronic authentication method in which the user is granted access only after successfully presenting factors from two or more categories to an authentication mechanism. For example, the user may be required to provide a user id and password in combination with an OTP in order to log-in to a computing system.

SUMMARY

According to one embodiment, a method, computer system, and computer program product for user authentication. The embodiment may include receiving, from a first device, multiple location coordinates of the first device. The embodiment may include storing, on a second device, a second moving window comprising last n location coordinates of the multiple location coordinates. The embodiment may include receiving, from the first device, a request to access the second device, wherein the request comprises log-in credentials of a user and a first hash value. The embodiment may include computing, on the second device, a second hash value based on a set of the last n location coordinates of the second moving window. The embodiment may include verifying the log-in credentials of the user. The embodiment may include comparing the first hash value and the second hash value. In response to the first hash value and the second hash value being equal and the log-in credentials being verified, the embodiment may include granting access to the second device via the first device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to multi-factor authentication of a user. The following described exemplary embodiments provide a system, method, and program product to, among other things, authenticate a user via a received hash value of sampled (i.e., identified) location coordinates of a registered computing device co-located with the user, in addition to received log-in credentials (e.g., user id and password) of the user. Therefore, the present embodiment has the capacity to improve the technical field of multi-factor authentication by authenticating a user based, in part, on a dynamically computed hash value of a set of identified location coordinates of a user which is sent to an authenticating server along with log-in credentials of the user, thus eliminating multiple round-trip communications between the user and the authenticating server.

As previously described, user authentication verifies the identity of a user requesting access to a computing system by authorizing a human-to-machine transfer of credentials during interactions on a network to confirm the user's authenticity. Authentication helps to ensure only authorized users gain access (i.e., log-in) to a network or computing system by preventing unauthorized users from gaining such access. Categories of factors (i.e., pieces of evidence) used in user authentication may include knowledge factors, possession factors, and inherence factors. Knowledge factors may include things the user must know in order to log-in to the network or computing system (e.g., username, user id, password, personal identification numbers). Possession factors may include things the user must have in their possession in order to complete the log-in (e.g., one-time password (OTP), key fob, smartphone app, employee identification card). Inherence factors may include characteristics inherent to the user which confirm their identity (e.g., biometrics, facial recognition, voice authentication). MFA is an electronic authentication method in which the user is granted access only after successfully presenting factors from two or more categories to an authentication mechanism. For example, the user may be required to provide a user id and password in combination with an OTP in order to log-in to a computing system.

An OTP is a password that is valid for only one log-in session or transaction on a computer system or other digital device. OTPs may provide more enhanced protection than static passwords which remain the same for multiple log-in sessions as an OTP works through randomness algorithms that generate a new and random password each time they are used. OTP generation may utilize several techniques including time-synchronization and mathematical algorithm schemes. The OTP mechanism to enhance authentication is widely used, however, it is time consuming as multiple round-trip communications between a user and an authenticating server are required before access is granted. For example, a first round-trip communication between the user and the authenticating server may include the user sending, via a client device, a user id and password to the authenticating server and, in response, receiving an OTP from the authenticating server. Subsequently, a second round-trip communication between the user and the authenticating server may include the user sending, via the client device, the OTP back to the authenticating server and, in response, receiving verification/access from the authenticating server. These multiple round-trip communications between the user and the authenticating server and may delay the user as they wait to receive an OTP and may consequently reduce productivity of the user. Further, the OTP mechanism may have an added disadvantage of preventing the user from accessing certain resources when they are needed in real-time. It may therefore be imperative to have a system in place to provide MFA utilizing information relating to identified location coordinates of a user which is sent for authentication along with a user id and a password of the user. Thus, embodiments of the present invention may be advantageous to, among other things, compute a hash value of identified location coordinates of a computing device co-located with a user, authenticate the user utilizing the computed hash value in combination with a user id and a password of the user, and eliminate the need for a second round-trip communication for MFA of the user. The present invention does not require that all advantages need to be incorporated into every embodiment of the invention.

According to at least one embodiment, a user may register a Global Positioning System (GPS) enabled electronic device (e.g., a smartphone) with an authenticating server. The registered device may periodically identify its location coordinates and share them with the authenticating server. A moving window of location coordinates (e.g., the last n identified location coordinates) may be maintained on the registered device and on the authenticating server. Upon the user requesting access to the authenticating server via the registered device, login credentials (e.g., user id and password) of the user and a registered device computed hash value of a set of location coordinates of the moving window may be sent to the authenticating server for authentication. The user may be granted access to the authenticating server where the authentication has determined valid login credentials and a match between the registered device computed hash value and an authenticating server computed hash value of the set of location coordinates of the moving window. According to at least one embodiment, a frequency of location coordinate identification, a number of location coordinates stored within the moving window, and an applied hashing algorithm may be defined during a system initialization phase and implemented by both the registered device and the authenticating server. According to at least one other embodiment, access to the authenticating server may be based, in part, on a comparison of the identified location coordinates of the registered device maintained on the registered device and the identified location coordinates of the registered device maintained on the authenticating server. According to at least one further embodiment, an OTP may be additionally utilized for authentication where there has been no change among the last n identified location coordinates of the registered device.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to authenticate a user based, in part, on information relating to a set of identified location coordinates of an electronic device co-located with the user and, accordingly, grant the user access to a computing system, and/or an application of the computing system, in response to a successful authentication.

Figure 1:
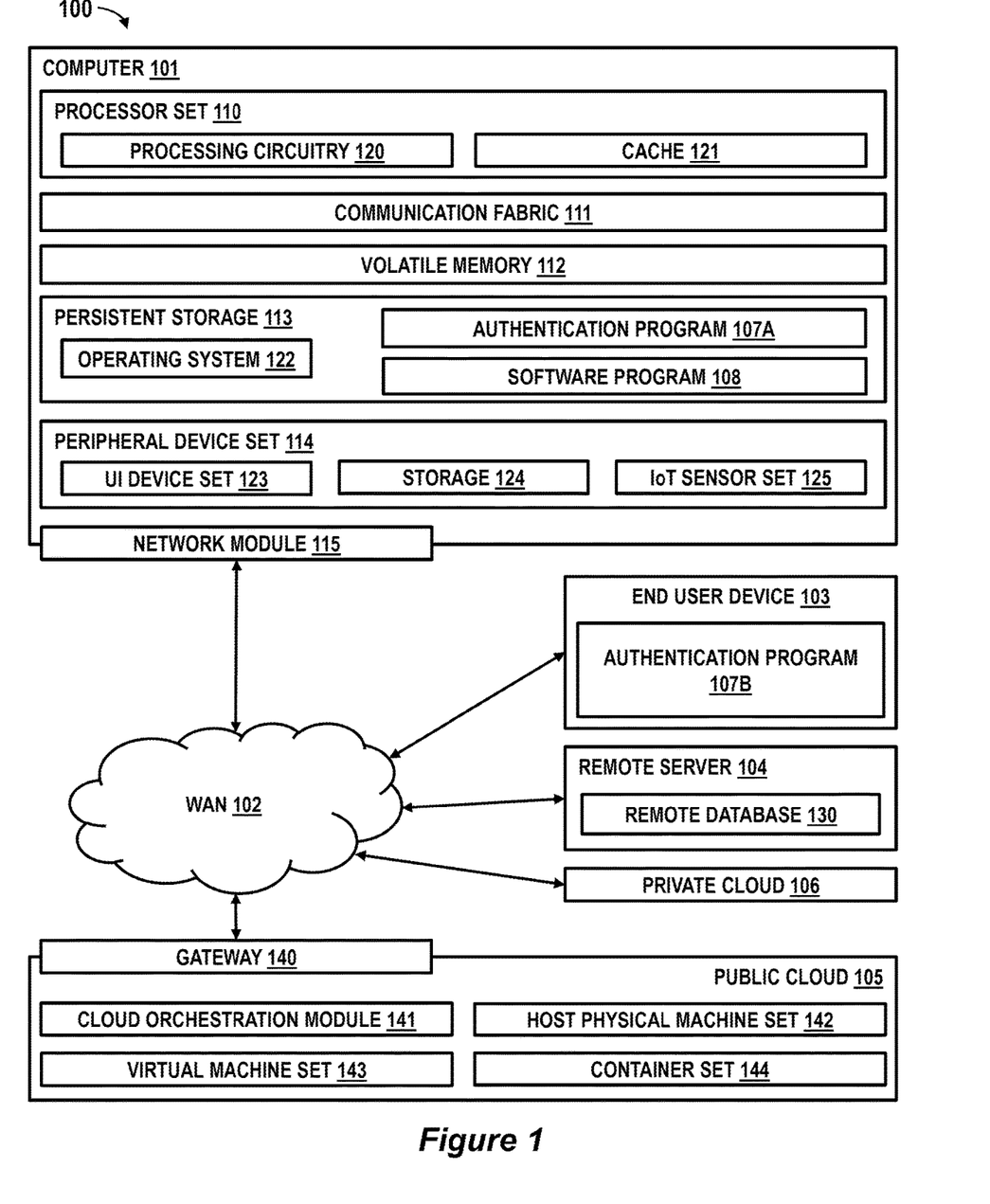
FIG. 1 illustrates an exemplary computer environment according to at least one embodiment.

Referring to FIG. 1, an exemplary computing environment 100 is depicted, according to at least one embodiment. Computing environment 100 contains an example of an environment for the execution of at least some of the computer code involved in performing the inventive methods, such as authentication program 107A, 107B. The authentication program 107A, 107B may be a program capable of granting a user access to a computing system based on authentication of data relating to periodically identified location coordinates of the user. In at least one embodiment, the authentication program 107A, 107B may require a user to opt-in to system usage upon opening or installation of the authentication program 107A, 107B. The authentication method is explained in further detail below with respect to FIG. 2. In addition to authentication program 107A, 107B, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122, software program 108, and authentication program 107A, 107B), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Notwithstanding depiction in computer 101 and end user device 103, authentication program 107A, 107B may be stored in and/or executed by, individually or in any combination, end user device 103, remote server 104, public cloud 105, and private cloud 106 so that functionality may be separated among the devices.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in authentication program 107A, 107B in persistent storage 113 and end user device 103, respectively.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in authentication program 107A, 107B typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, and yet another sensor may be a GPS receiver which provides computer 101 with satellite navigation and geographic location identification capability.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 may be capable of hosting and running an authentication program 107B and communicating with computer 101 via WAN 102, in accordance with embodiments of the invention. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
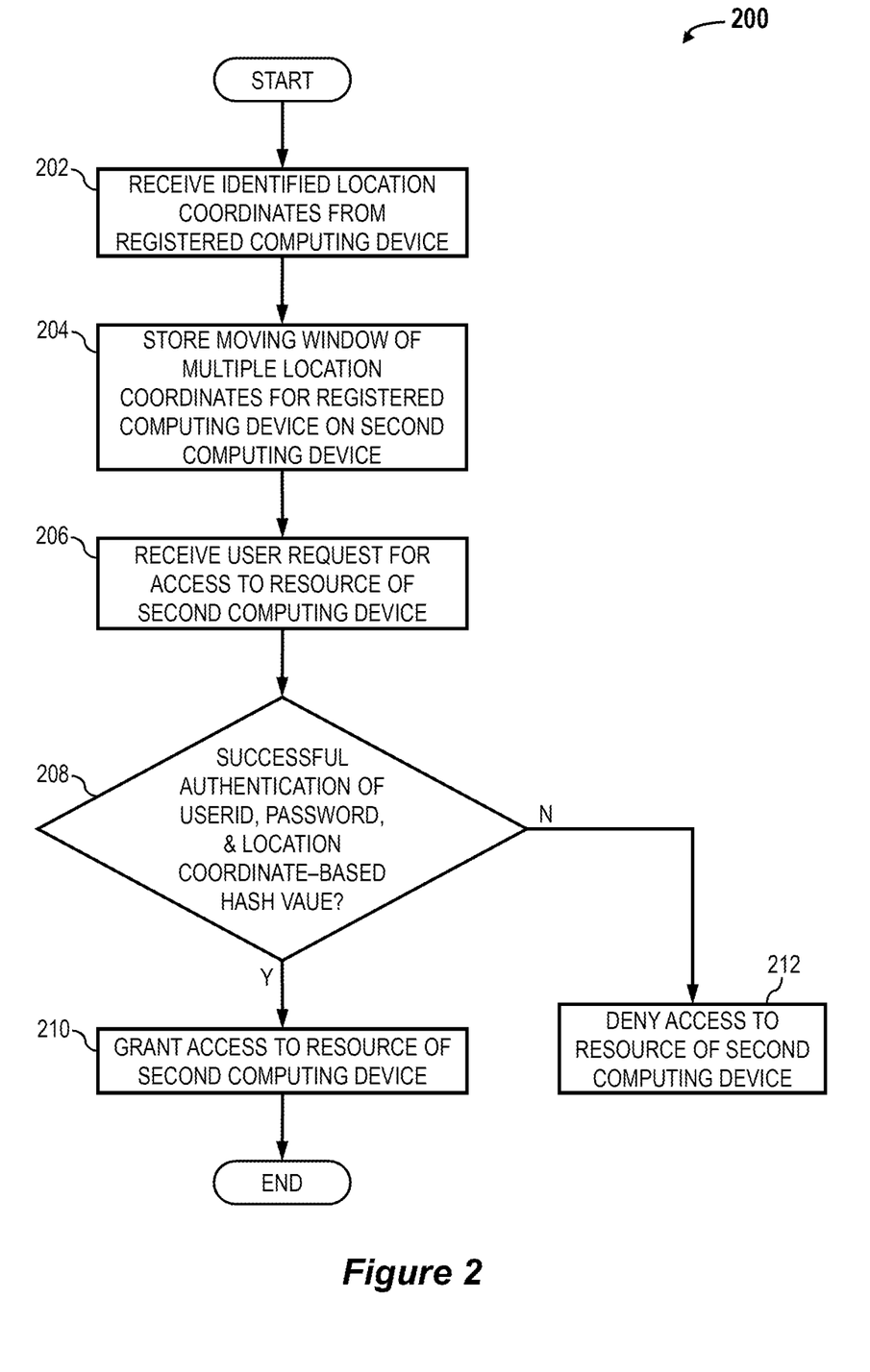
FIG. 2 illustrates an operational flowchart for authenticating a user via a location sampling multi-factor authentication process according to at least one embodiment.

Referring now to FIG. 2, an operational flowchart for authenticating a user via a location sampling/identifying multi-factor authentication process 200 is depicted according to at least one embodiment. At 202, authentication program 107A, 107B periodically receives GPS location coordinates of a registered electronic device (e.g., a smartphone) which is co-located with a user. According to least one embodiment, during an initialization/set-up phase of authentication program 107A, 107B the user may register one or more electronic devices (e.g., a smartphone, a laptop computer) with which the user may access another computing device, and/or an application of another computing device, pending a successful authentication by authentication program 107A, 107B. Each electronic device (e.g., computer 101) registered by the user may execute a local instance of authentication program 107A, 107B and may utilize GPS receivers to periodically identify its geographic location coordinates (i.e., numeric values for latitude and longitude). A location coordinate identification frequency for registered devices may be initially specified by the user during the set-up phase of authentication program 107A, 107B, and may be later updated by the user or by authentication program 107A, 107B. For example, the user may initially specify a location coordinate identification frequency of once every half hour, hour, day, etc. for all registered devices. During implementation, the registered device may periodically identify, according to the location coordinate identification frequency, its geographic location coordinates and transmit them to an instance of authentication program 107A, 107B executing on a second computing device (e.g., end user device 103, an authenticating server). Furthermore, authentication program 107A, 107B may instruct the registered device to locally store a moving window of the last n identified location coordinates (e.g., the last four identified location coordinates). The size of the moving window (i.e., the value of n) may be initially specified by the user during the set-up phase of authentication program 107A, 107B, and may be later updated by the user or by authentication program 107A, 107B.

Next, at 204, the authentication program 107A, 107B stores, on the second computing device, a moving window of the location coordinates received for the registered device. According to at least one embodiment, the stored moving window of location coordinates received from the registered device may be equal in size (i.e., the value of n) to the moving window of identified location coordinates stored on the registered device. For example, the registered device may store the last four of its identified location coordinates within its locally stored moving window, and the second computing device may also store, within its locally stored moving window, the last four identified location coordinates received from the registered device. In doing so, the registered device and the second computing device may each maintain a moving window of the last four identified location coordinates, of the registered device, which are identical to each other (i.e., they each contain the same set of identified location coordinates for the registered device).

According to at least one other embodiment, in a scenario in which the user has registered multiple electronic devices, authentication program 107A, 107B may store, on each registered device, a respective moving window of its last n identified location coordinates. Similarly, authentication program 107A, 107B may also store and maintain, within the second computing device, a respective moving window of the last n identified location coordinates received from each registered device.

At 206, the authentication program 107A, 107B receives a request from the user to access the second computing device, and/or an application on the second computing device, via the registered device. According to at least one embodiment, the received request from the user may include log-in credentials of the user, such as a user id and a password, as well as a hash value of a set of identified location coordinates from the moving window of the last n identified location coordinates stored on the registered device. For example, where the moving window includes the last four identified location coordinates of the registered device, the hash value may be computed using a set of the last one, two, three, or four identified location coordinates from the moving window stored on the registered device. The hash value may be requested on-demand by the user and computed by the instance of authentication program 107A, 107B executing on the registered device. According to at least one other embodiment, the hash value may be automatically computed by the instance of authentication program 107A, 107B executing on the registered device in response to the user's request to access the second computing device and transmitted along with the log-in credentials of the user. The hashing algorithm (H) (e.g., a version of secure hash algorithm (SHA) or message-digest algorithm (MD5)) utilized by authentication program 107A, 107B may be initially specified by the user during the set-up phase of authentication program 107A, 107B, and may be later updated by the user or by authentication program 107A, 107B. Also, the number of identified location coordinates to be hashed (L) may be initially specified by the user during the set-up phase of authentication program 107A, 107B, and may be later updated by the user or by authentication program 107A, 107B.

Next, at 208, the authentication program 107A, 107B determines whether authentication (i.e., validation) of the received user request for access to the second computing device is successful or not. In making this determination, the instance of authentication program 107A, 107B executing on the second computing device may extract the user id and password from the received request and compare them against log-in credentials (e.g., user ids and passwords) stored in a database of authorized users of the second computing device. Furthermore, the instance of authentication program 107A, 107B executing on the second computing device may also compute a hash value of a set of identified location coordinates from the moving window of the location coordinates received for the registered device and stored on the second computing device. Both the hashing algorithm (H) and the number of identified location coordinates to be hashed (L) utilized by the instance of authentication program 107A, 107B executing on the second computing device may be the same H and L utilized by the instance of authentication program 107A, 107B executing on the registered device. For example, the instance of authentication program 107A, 107B executing on the registered device may utilize the hashing algorithm MD5 to compute a hash value based on the last three identified location coordinates within its locally stored moving window. Similarly, the instance of authentication program 107A, 107B executing on the second computing device may also utilize the hashing algorithm MD5 to compute a hash value based on the last three identified location coordinates within its locally stored moving window for the registered device.

With continued reference to step 208, authentication of the received user request for access to the second computing device may be determined successful where there is both a match between the log-in credentials (i.e., user id and password) received at 206 and log-in credentials stored in the database of authorized users of the second computing device, and a match (i.e., equal values) between the hash value computed at 206 by the instance of authentication program 107A, 107B executing on the registered device and the hash value computed by the instance of authentication program 107A, 107B executing on the second computing device. It should be noted that any difference between the respective location coordinates utilized by the instances of authentication program 107A, 107B executing on the registered device and on the second computing device to compute their respective hash values may result in the respective hash values not being equal. Authentication of the received user request for access to the second computing device may not be determined successful where there is not a match between the hash value computed by the instance of authentication program 107A, 107B executing on the registered device and the hash value computed by the instance of authentication program 107A, 107B executing on the second computing device. In response to determining that authentication of the received user request for access to the second computing device is successful (step 208, "Y" branch), the location sampling multi-factor authentication process 200 may proceed to step 210. In response to determining that authentication of the received user request for access to the second computing device is not successful (step 208, "N" branch), the location sampling multi-factor authentication process 200 may proceed to step 212.

According to at least one other embodiment, determination of whether authentication of the received user request for access to the second computing device is successful may be based on a comparison of the stored identified location coordinates for the registered device. In such an embodiment, authentication program 107A, 107B may compare the last n identified location coordinates of the moving window stored on the registered device to the last n identified location coordinates of the moving window stored on the second computing device. For example, authentication of the received user request for access to the second computing device may be determined successful where there is a match between the log-in credentials (i.e., user id and password) received at 206 and log-in credentials stored in the database of authorized users of the second computing device, and where the respective moving windows stored on the registered device and on the second computing device are the same (i.e., the last n identified location coordinates for the registered device stored therein match the last n identified location coordinates for the registered device stored on the second computing device). Authentication of the received user request for access to the second computing device may be determined unsuccessful where the respective moving windows stored on the registered device and on the second computing device differ. In response to determining that authentication of the received user request for access to the second computing device is successful (step 208, "Y" branch), the location sampling multi-factor authentication process 200 may proceed to step 210. In response to determining that authentication of the received user request for access to the second computing device is not successful (step 208, "N" branch), the location sampling multi-factor authentication process 200 may proceed to step 212.

According to a further embodiment, where there is no change among two or more identified location coordinates within the moving window of the location coordinates received for the registered device and stored on the second computing device, authentication program 107A, 107B may additionally utilize, or revert to, an OTP during the determination of whether authentication of the received user request for access to the second computing device is successful. For example, if the last two or more of the last n identified location coordinates received for the registered device and stored within the moving window of the second computing device are the same (i.e., there has been no change), the instance of authentication program 107A, 107B executing on the second computing device may additionally utilize an OTP procedure as part of the determination of whether authentication of the received user request for access to the second computing device is successful.

At 210, in response to determining that authentication of the received user request for access to the second computing device is successful, the instance of authentication program 107A, 107B executing on the second computing device grants the user access to the second computing device, and/or an application on the second computing device, via the registered device. Accordingly, through the use of the location sampling/identifying multi-factor authentication process 200, the user has gained access to the second computing device after one round-trip of communication between the registered device and the second computing device despite the implementation of multi-factor authentication.

According to at least one other embodiment, in response to determining that authentication of the received user request for access to the second computing device is successful, the instance of authentication program 107A, 107B executing on the second computing device may also determine if an update to one or more of the location coordinate identification frequency (F), the size (N) of the moving windows maintained on the registered device and on the second computing device, the hashing algorithm (H) utilized by the registered device and the second computing device, and the number of identified location coordinates to be hashed (L) using H is required. As mentioned above, the values of F, N, H, and L may be initially configured by the user during a set-up phase and implemented uniformly across the instances of authentication program 107A, 107B executing on the registered device and on the second computing device. Post set-up, the instance of authentication program 107A, 107B executing on the second computing device may unilaterally determine that an update is required to one or more of F, N, H, and L, and transmit an update message to the instance of authentication program 107A, 107B executing on the registered device while currently, or before, granting the user access to the second computing device, and/or an application on the second computing device. The update message may contain information specifying new values for one or more of F, N, H, and L to be implemented uniformly across all executing instances of authentication program 107A, 107B. The instance of authentication program 107A, 107B executing on the second computing device may update one or more of F, N, H, and L upon transmitting the update massage, and the instance of authentication program 107A, 107B executing on the registered device may update one or more of F, N, H, and L upon receiving the update massage.

For example, a required change to the location coordinate identification frequency (F) may be determined where location coordinates of the registered device are being identified frequently (e.g., every 30 minutes), yet the second computing device access request (i.e., log-in) frequency of the user is infrequent (e.g., once every 3 days). In such a scenario, the instance of authentication program 107A, 107B executing on the second computing device may determine that a reduction to the location coordinate identification frequency is required. As another example, a required change to the hashing algorithm (H) utilized by the registered device and the second computing device may be determined where H has been used beyond a threshold amount of time (e.g., a number of hours or days). As yet another example, a required change to the number of identified location coordinates to be hashed (L) using H may be determined as a consequence of user movement behavior. For instance, in a scenario where the user is not moving frequently and a current L value results in unchanging location coordinates being hashed, the instance of authentication program 107A, 107B executing on the second computing device may determine that an increase to L is required.

At 212, in response to determining that authentication of the received user request for access to the second computing device is not successful, the instance of authentication program 107A, 107B executing on the second computing device denies the user access to the second computing device, and/or an application on the second computing device, via the registered device. The instance of authentication program 107A, 107B executing on the second computing device may also send a message to the registered device indicting the reason(s) for the denial of access.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   storing, on a first device, a first moving window comprising last n location coordinates of multiple location coordinates of the first device, wherein location coordinates of the multiple location coordinates of the first device are identified and sent to a second device according to a location coordinate identification frequency;
   receiving at the second device, from the first device, multiple identified location coordinates of the first device;
   storing, on the second device, a second moving window comprising last n location coordinates of the multiple identified location coordinates;
   receiving, from the first device, a request to access the second device, wherein the request comprises log-in credentials of a user and a first hash value;
   computing, on the second device, a second hash value based on a set of the last n location coordinates of the second moving window;
   verifying the log-in credentials of the user;
   comparing the first hash value and the second hash value; and
   in response to the first hash value and the second hash value being equal, and the log-in credentials being verified, granting access to the second device via the first device.

2. The method of claim 1, wherein the first hash value is computed on the first device and is based on a set of the last n location coordinates of the first moving window.

3. The method of claim 2, wherein the first hash value and the second hash value are computed using a same hashing algorithm, and wherein the set of the last n location coordinates of the first moving window and the set of the last n location coordinates of the second moving window have a same set size, and wherein a set size comprises a number of location coordinates.

4. The method of claim 1, wherein verifying the log-in credentials of the user further comprises:
   extracting a user id and a password from the log-in credentials;
   comparing the user id and the password against user ids and passwords stored in a database of authorized users of the second device; and
   determining a match for the user id and the password.

5. The method of claim 1, wherein the first device is co-located with the user.

6. The method of claim 1, wherein the multiple location coordinates comprise Global Positioning System (GPS) coordinates.

7. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   storing, on a first device, a first moving window comprising last n location coordinates of multiple location coordinates of the first device, wherein location coordinates of the multiple location coordinates of the first device are identified and sent to a second device according to a location coordinate identification frequency;
   receiving at the second device, from the first device, multiple identified location coordinates of the first device;
   storing, on the second device, a second moving window comprising last n location coordinates of the multiple identified location coordinates;
   receiving, from the first device, a request to access the second device, wherein the request comprises log-in credentials of a user and a first hash value;
   computing, on the second device, a second hash value based on a set of the last n location coordinates of the second moving window;
   verifying the log-in credentials of the user;
   comparing the first hash value and the second hash value; and
   in response to the first hash value and the second hash value being equal, and the log-in credentials being verified, granting access to the second device via the first device.

8. The computer system of claim 7, wherein the first hash value is computed on the first device and is based on a set of the last n location coordinates of the first moving window.

9. The computer system of claim 8, wherein the first hash value and the second hash value are computed using a same hashing algorithm, and wherein the set of the last n location coordinates of the first moving window and the set of the last n location coordinates of the second moving window have a same set size, and wherein a set size comprises a number of location coordinates.

10. The computer system of claim 7, wherein verifying the log-in credentials of the user further comprises:
    extracting a user id and a password from the log-in credentials;
    comparing the user id and the password against user ids and passwords stored in a database of authorized users of the second device; and
    determining a match for the user id and the password.

11. The computer system of claim 7, wherein the first device is co-located with the user.

12. The computer system of claim 7, wherein the multiple location coordinates comprise Global Positioning System (GPS) coordinates.

13. A computer program product, the computer program product comprising:
    one or more computer-readable tangible storage medium and program instructions stored on at least one of the one or more tangible storage medium, the program instructions executable by a processor capable of performing a method, the method comprising:
        storing, on a first device, a first moving window comprising last n location coordinates of multiple location coordinates of the first device, wherein location coordinates of the multiple location coordinates of the first device are identified and sent to a second device according to a location coordinate identification frequency;
        receiving at the second device, from the first device, multiple identified location coordinates of the first device;
        storing, on the second device, a second moving window comprising last n location coordinates of the multiple identified location coordinates;
        receiving, from the first device, a request to access the second device, wherein the request comprises log-in credentials of a user and a first hash value;
        computing, on the second device, a second hash value based on a set of the last n location coordinates of the second moving window;
        verifying the log-in credentials of the user;
        comparing the first hash value and the second hash value; and
        in response to the first hash value and the second hash value being equal, and the log-in credentials being verified, granting access to the second device via the first device.

14. The computer program product of claim 13, wherein the first hash value is computed on the first device and is based on a set of the last n location coordinates of the first moving window.

15. The computer program product of claim 14, wherein the first hash value and the second hash value are computed using a same hashing algorithm, and wherein the set of the last n location coordinates of the first moving window and the set of the last n location coordinates of the second moving window have a same set size, and wherein a set size comprises a number of location coordinates.

16. The computer program product of claim 13, wherein verifying the log-in credentials of the user further comprises:
    extracting a user id and a password from the log-in credentials;
    comparing the user id and the password against user ids and passwords stored in a database of authorized users of the second device; and
    determining a match for the user id and the password.

17. The computer program product of claim 13, wherein the first device is co-located with the user.

* * * * *